Figure 2:
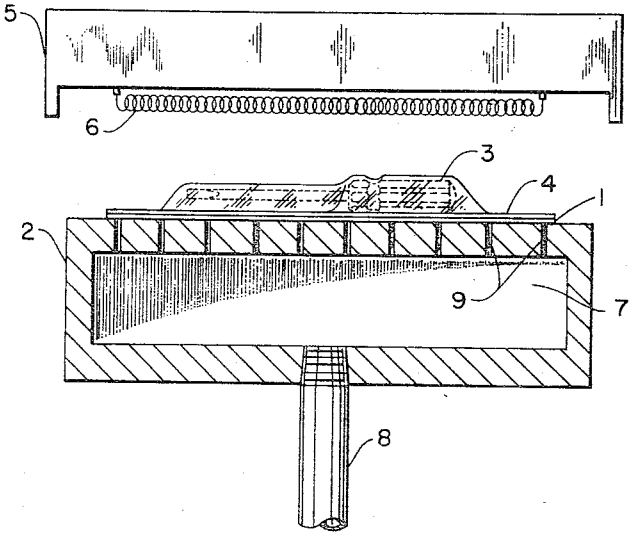
Figure 1:
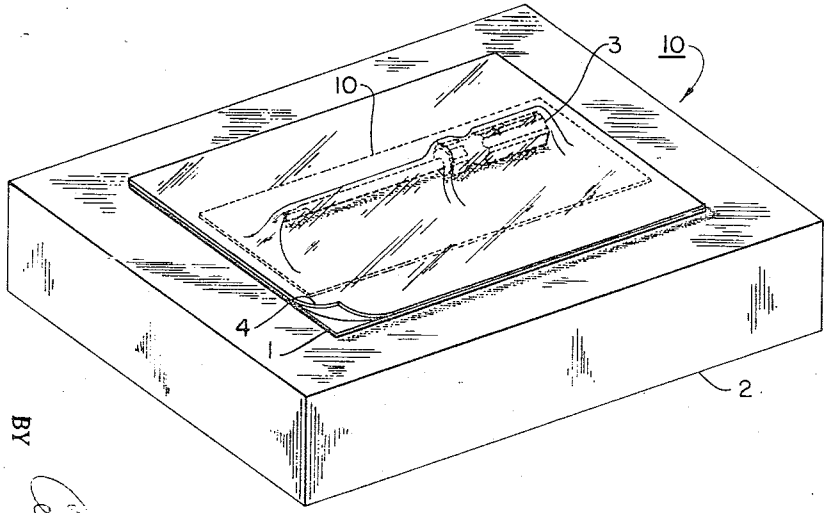

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 420

T896,023

SKIN PACKAGING AND ENCAPSULATING ARTICLES SUPPORTED ON A PLASTIC SUBSTRATE

Barry S. Rope, 25610 Shiawassee, Apt. 162, Southfield, Mich., and Ernest L. Myers, Rte. 1, Hiltons, Va. 24258

Filed Dec. 2, 1970, Ser. No. 94,258

Int. Cl. B65d *73/00, 75/36, 85/00*

U.S. Cl. 206—80 A

1 Sheet Drawing. 11 Pages Specification

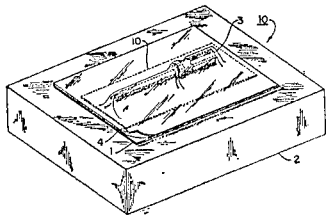

In the so-called "skin packaging" process an article to be packaged is laid on a substrate, or supporting element, in the form of a cardboard or other porous sheet of such size as to leave a substantial portion of free margin around the article. A thin transparent film of thermoplastic material, heated to a sufficient temperature so as to be in a softened and tacky condition, is then draped over the article. Application of a vacuum to the underside of the substrate causes the covering film to bond to the substrate and thus completely enclose the article. By employing a substrate comprising an impervious, thermoplastic material composed of a material the same as or similar to that of the covering sheet, in lieu of the cardboard or porous substrate, the article to be packaged can be completely encapsulated with the result that gaseous, vaporous or solid impurities are kept out of contact with the packaged article. This improved method and means of skin packaging is useful in packaging a wide variety of commercial products and is especially useful in the packaging of surgical materials or instruments which must be kept sterile and free from all impurities or microorganisms while in packaged form.

March 14, 1972 B. S. ROPE ET AL T896,023

SKIN PACKAGING AND ENCAPSULATING ARTICLES
SUPPORTED ON A PLASTIC SUBSTRATE
Filed Dec. 2, 1970

BARRY S. ROPE
ERNEST L. MYERS
INVENTORS

BY Cecil D. Quillen

ATTORNEY